No. 810,517. PATENTED JAN. 23, 1906.
E. T. ZEIDLER.
WEIGHING DEVICE FOR VEHICLES.
APPLICATION FILED APR. 21, 1905.
3 SHEETS—SHEET 1.
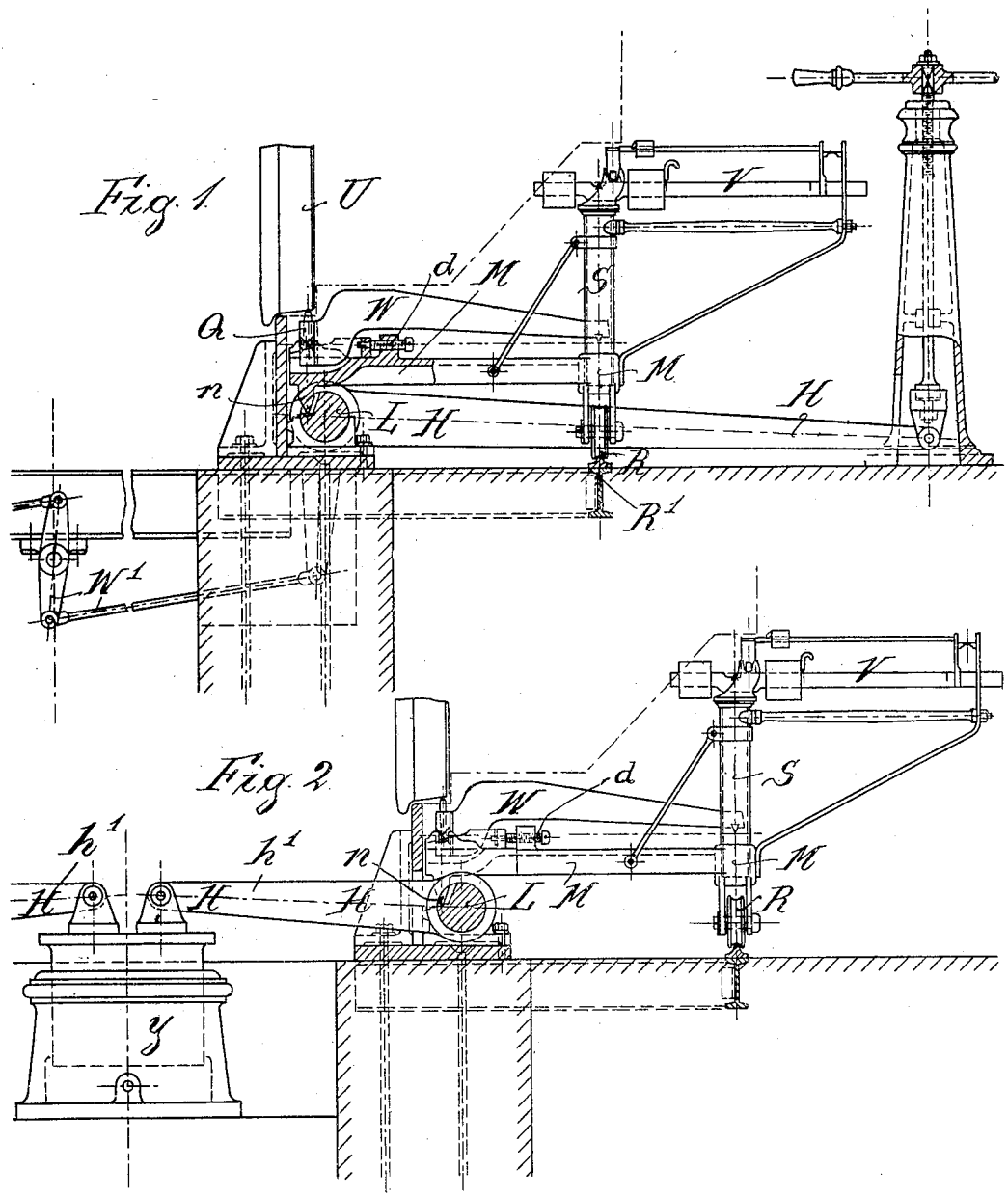

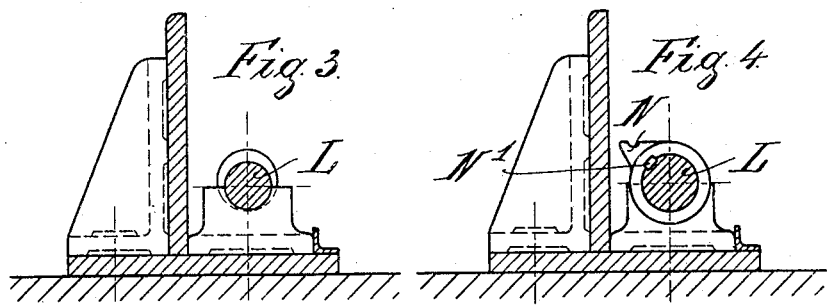
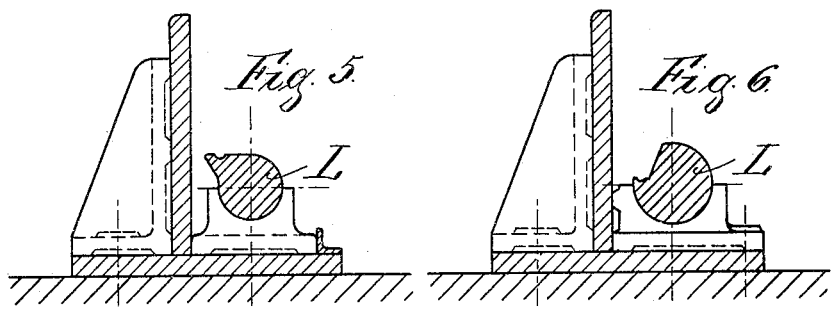

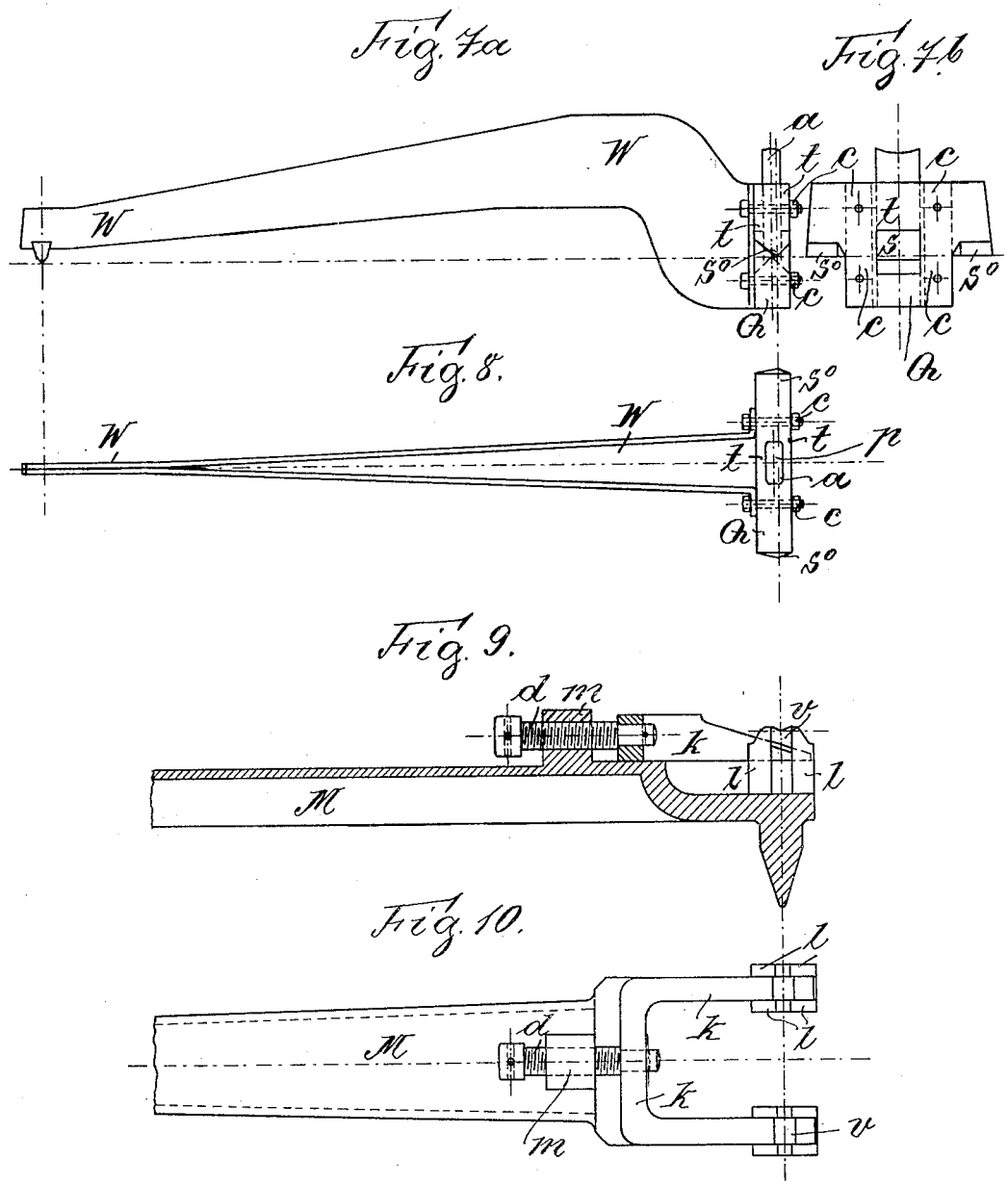

UNITED STATES PATENT OFFICE.

EMIL THEODOR ZEIDLER, OF RIESA, GERMANY.

WEIGHING DEVICE FOR VEHICLES.

No. 810,517.        Specification of Letters Patent.        Patented Jan. 23, 1906.

Application filed April 21, 1905. Serial No. 256,747.

*To all whom it may concern:*

Be it known that I, EMIL THEODOR ZEIDLER, a subject of the King of Saxony, and a resident of Riesa, in the Kingdom of Saxony, German Empire, have invented certain new and useful Improvements in Weighing Devices for Railway-Vehicles, of which the following is an exact specification.

My invention relates to improvements in weighing devices for railway-vehicles, and especially for determining the weight resting upon each wheel of the vehicle. In such devices the single scales required for this purpose must be moved under the vehicle-wheels and the play between the wheels and the scales must be removed, and, furthermore, the wheels must be raised from the rails, so as to allow the scales to weigh, and must then be again put down upon the rails. For these operations a raising device was required which in the devices hitherto known was operated by the intermediacy of the scales, whereby the whole construction of the arrangement was very complicated. I avoid these disadvantages and simplify the construction by arranging the raising and lowering device separately from the scales proper.

In order to make my invention more clear, I refer to the accompanying drawings, in which—

Figure 1 shows a convenient form of the invention. Fig. 2 shows another constructional form. Figs. 3 to 10 illustrate details.

In the drawings L is an excenter or cam shaft arranged on the side of the railway-rail.

M is the frame of a scale and rests with one end $n$ upon the shaft L and with the other end, together with the scale-post S, upon the roller R, resting upon a rail R'. In the upper end of the post S the weighing-lever V is mounted.

W is a double-armed lever which rests with its left-hand end, the so-called "edge body" Q, upon the end $n$ of the frame M and is suitably connected in known manner with its other right-hand end to the weighing-lever V. The distance between the shaft L and the lower edge of the wheel U to be weighed is very limited, and therefore the lever W is of special construction and forms part of the present invention, being clearly illustrated in Figs. 7$^a$, 7$^b$, 8, and 9. As clearly seen in Fig. 8, the load-lever proper consists of two parts, the fork W and the edge body Q. The forked parts are bent at the ends to form two flanges, secured to the edge body Q by means of screws or rivets $c\ c$. $s^\circ\ s^\circ$ are the turning edges and are situated in step-bearings $v\ v$, vertically adjustable by the adjusting-screw $d$ (see Figs. 10 and 11) and the stay-wedge $k$. The stay-wedge $k$ is forked and situated upon the frame M. The adjusting-screw $d$ is mounted in the projection $m$ of the frame M. The step-bearings $v\ v$ are situated upon the wedge-shaped fork ends of the stay-wedges, being prevented from moving horizontally by the guide-bars $l\ l$, arranged on the frame M. The step-bearings $v\ v$ therefore can be moved only vertically. $s$ is the load edge for conveniently transferring the load upon this, and in order to prevent too great a weakening of the edge-body Q the middle part $t$ is provided above the edge $s$ with a perforation to receive a pin $a$, projecting over the upper surface of the body Q and supporting the wheel U to be weighed.

The raising of the wheel U is effected by means of a lever H, the outside end of which is raised and lowered by a hand-actuating device to be seen from Fig. 1. The left-hand end of H is firmly connected to the shaft L. If several wheels U are simultaneously to be weighed, the whole device is to be provided with a corresponding number of scales and cam-shafts L, which latter are then so connected by means of rods W' that they can simultaneously be actuated by turning the lever H. In the device shown in Fig. 2 a pressure-cylinder Y is arranged between the two railway-rails, the piston of which cylinder is connected to the two levers H' H', firmly secured on the outside end to the cam-shaft L. The shaft itself L can be an excenter-shaft, as shown in Fig. 3, or there may be provided a cylindrical shaft L, having a groove on its whole length, into which a plurality of feathers N', fastened into cam-levers N, engages, or the cam-shaft may be on its whole length of the shape indicated in Fig. 5 in section, or the cylindrical shaft L itself may be partly cut out, (see Fig. 6,) so as to furnish a support to the one end of the frame M.

The operation of the device is as follows: If the pressure of the single wheels of a locomotive or the like shall be determined, a balance or scale is brought under each wheel by moving the balances along the rail R' and upon the excenter or cam shaft L until the supporting-pin $a$ is under the wheel U. After this has been done there will be a certain free space between the upper end of the support $a$ and the lowest point of the wheel U. In order to eliminate this free space, the edge body Q of lever W is so adjusted by means of the adjusting-screw $h$ that the upper edge body of $a$ touches its corresponding wheel U. After having brought under each of the wheels to be weighed a balance in its proper position, as just described, the excenter or cam shaft or shafts L are turned so that the left-hand end $n$ of the balance-frame M, together with the end Q of the lever W, are moved upward, thereby raising at the same time the wheel U, so that the latter rests, by means of the pin $a$, upon the load edge $s$. Now the weighing can begin, and after it has been effected the shaft L is turned back, whereby the wheels U are again placed upon the rails. The edge-body Q is then again lowered by means of the adjusting device $d$, whereby the whole operation is finished and the vehicle can run off.

Having thus fully described the nature of my invention, what I desire to secure by Letters Patent of the United States is—

1. A weighing device for determining the single-wheel pressures of railway-vehicles comprising in combination the balance proper, a weighing-lever for transferring the wheel-load to the balance, an edge body secured to said lever, a frame M for carrying the said lever, a shaft parallelly arranged to the rails and supporting said frame, and means for rotating the shaft, substantially as described and for the purpose set forth.

2. A weighing device for simultaneously determining the pressure of a plurality of railway-vehicle wheels, comprising in combination a corresponding number of balances proper, weighing-levers W for transforming the wheel-loads to the balances, edge bodies secured to said levers, frames carrying said levers, shafts supporting said frames and means for rotating the shafts, substantially as described and for the purpose set forth.

3. A weighing device for determining the single-wheel pressures of railway-vehicles comprising in combination the balance proper, a weighing-lever for transferring the wheel-load to the balance, an edge body secured to said lever, containing the load and the turning edges, a regulating device for adjusting the edge body respectively the weighing-lever, a frame upon which said regulating device is mounted, a shaft parallelly arranged to the rails and supporting said frame, and means for rotating the shaft, substantially as described and for the purpose set forth.

4. A regulating device for adjusting the edge body in respect to the weighing-lever, consisting of a fork-shaped part $k$ having two wedge-shaped peaks, movable step-bearings for carrying the turning edges of the edge body, guides $l$ for leading said step-bearings, and an adjusting-screw mounted in a projection $m$ of the frame M, substantially as described and for the purpose set forth.

In witness whereof I have hereunto set my hand in the presence of two witnesses.

EMIL THEODOR ZEIDLER.

Witnesses:
   PAUL E. SCHILLING,
   PAUL ARRAS.